Jan. 13, 1948.     H. WILSON     2,434,304
ADJUSTABLE SPRING SHACKLE
Filed Jan. 4, 1945     2 Sheets-Sheet 1
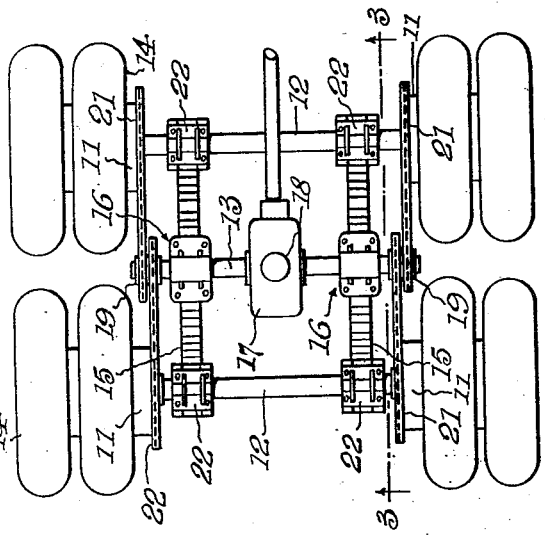
Inventor
Howard Wilson Jan. 13, 1948.  H. WILSON  2,434,304
ADJUSTABLE SPRING SHACKLE
Filed Jan. 4, 1945  2 Sheets-Sheet 2
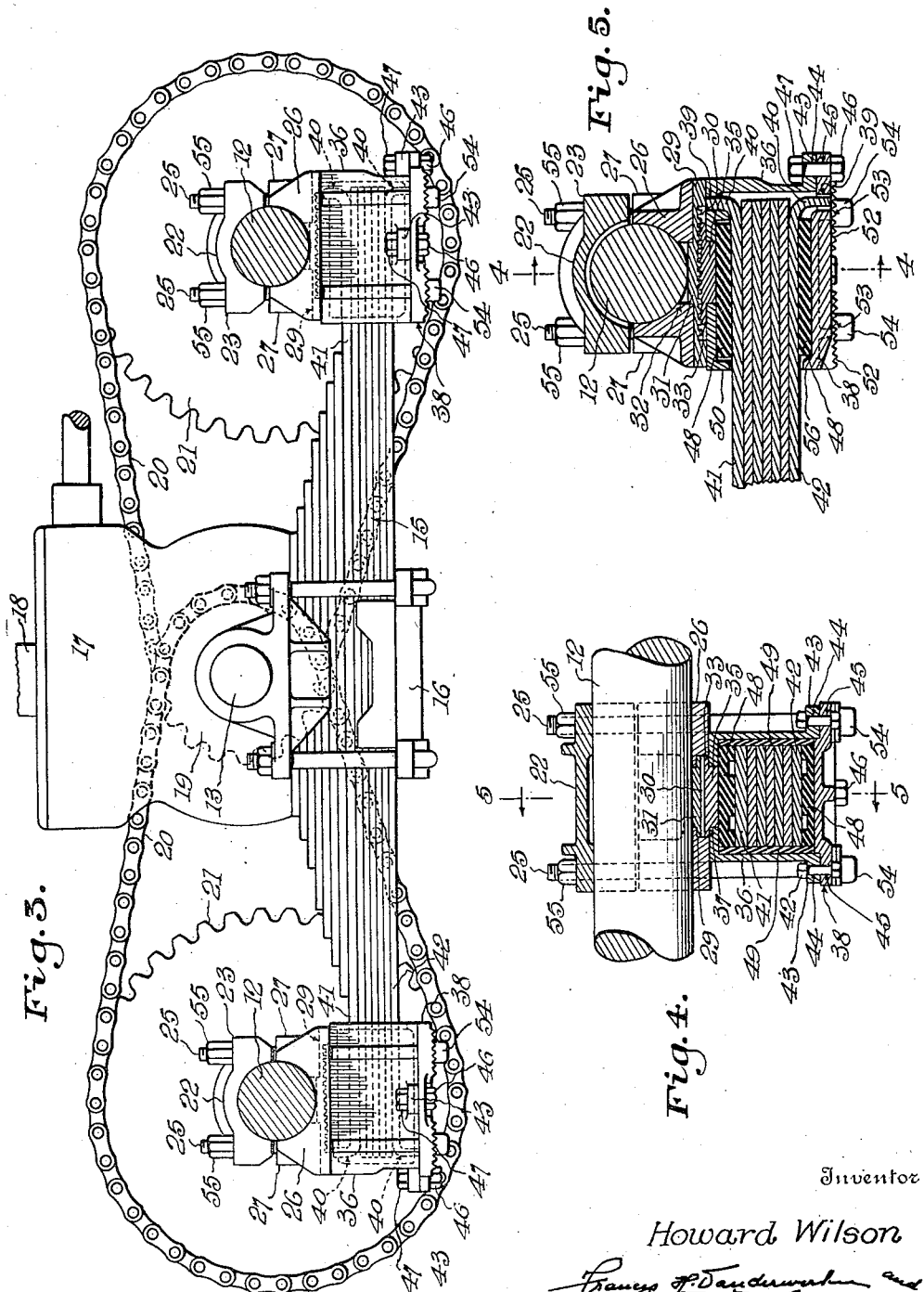
Inventor
Howard Wilson Patented Jan. 13, 1948

2,434,304

UNITED STATES PATENT OFFICE 2,434,304

ADJUSTABLE SPRING SHACKLE

Howard Wilson, Chevy Chase, Md.

Application January 4, 1945, Serial No. 571,346

6 Claims. (Cl. 267—54)

(Granted under the act of March 3, 1883, as amended April 30, 1928; 370 O. G. 757)

The invention described herein may be manufactured and used by or for the Government for governmental purposes, without payment to me of any royalty thereon.

This invention relates to spring mountings adapted to vary the distance between an axle and a jackshaft drive sprocket of chain driven vehicles. More particularly it is directed to an anchored spring shackle mounting adapted to vary the distance between an axle and a jackshaft drive sprocket of chain driven vehicles employing a bogie spring suspension whereby the springs also function as adjustable torque rods.

For the purposes of illustration and definiteness of description, the invention will be set forth as applied to a heavy duty truck or power driven trailer with sets of dual wheels hub attached at each end of two fixed axles connected by a pair of spaced apart parallel spring means supporting a driving gear box operably connected with a jackshaft. It is to be understood, however, that the invention is not to be limited to any such specific use, but is applicable to situations wherein like conditions obtain in whole or in part.

In chain driven motor vehicles, there are variations due to manufacture tolerances, wear of the driving and driven sprockets, and wear and stretch of the driving chains that necessitate some means of adjustment to compensate for these variations. Adjustable idler sprockets may be positioned in the chain circuit, but additional sprockets decrease the efficiency of the drive system and therefore have not been a popular method of adjusting the chain tension. The conventional method for making this adjustment has been to use unshackled spring mountings in conjunction with adjustable torque rods. This invention, however, is applied to a spring suspension which also serves as torque rods, as is broadly disclosed in the United States Patent No. 2,284,646, issued June 7, 1942, to Roy E. Eidal.

Generally, the object of this invention is to provide a confined or anchored spring mounting means which functions as torque rods and is adjustable to compensate for variations in the chain tension of chain drive vehicles.

A further and more specific object of this invention is to provide a device of the class herein described which is longitudinally adjustable to vary the distance between driving and driven members.

A still further object of this invention is to provide a device of the class herein described with releasable interlocking serrated members adapted to adjust the longitudinal relationship therebetween.

The above-mentioned objects of this invention, together with others inherent therein, are attained by the device described hereinafter, and, more fully understood by reading the specification in conjunction with the drawings forming a part thereof, wherein:

Fig. 1 is a diagrammatical plan view showing the relationship of the device applied to a heavy duty chain drive truck, parts being taken away;

Fig. 2 is a perspective of the component parts of the device disassembled;

Fig. 3 is a side elevation taken along line 3—3 of Fig. 1, parts being removed for clarity;

Fig. 4 is a sectional view of the spring mounting taken through the longitudinal axis of the axle, parts shown in elevation, as viewed substantially on line 4—4 of Fig. 5; and Fig. 5 is a sectional view taken substantially on line 5—5 of Fig. 4.

In the drawings where like members are given the same reference numeral, two spaced-apart parallel fixed axles 12 have wheels or sets of wheels 14 operatively connected with the respective end portions thereof and adapted to rotate about a hub connection. These two axles 12 are connected with each other by two parallel leaf springs 15. A transverse driving axle 13 positioned intermediate the fixed axles 12 and parallel thereto, is connected with the two leaf springs 15 by shackle means 16 and extends crosswise of the truck immediately above or below the leaf springs 15 and midway between the two ends of the said leaf springs 15.

Centrally positioned and operably connected to the driving axle 13 is a gear box 17 having a support 18 extending upwardly therefrom supporting a rigid transverse bolster, not shown.

The driving axle 13 is rotatably mounted in the shackles 16 and may be rotated by any means well known in the art such as the shaft gear box drive 17. Operably connected to the said driving axle 13 is a driving sprocket or sprockets 19 adapted to rotate with said axle. The driving sprockets 19 are connected by a sprocket chain 20 with driven sprockets 21 rigidly secured to a rotating brake drum 11 attached to the hub mounted wheels 14.

The spring shackle mounting means for connecting end portions of the leaf springs 15 to the axles 12 in a manner such that the axles may be laterally adjustable with respect to the springs are all of duplicate construction. Each mounting comprises a bearing cap 22 adapted to rest upon and fit the contour of the driven shaft 12, and is provided with flanges 23 having holes 24 drilled therethrough to receive mounting bolts 25. This bearing cap in addition to supporting the distributed load of the truck or trailer also supports the remainder of the adjustable shackle mounting suspended therefrom and through which the load is distributed to the bearing cap. A spring container seat 26 adapted to fit the contour of the shaft is positioned underneath the shaft and provided with lugs 27 having holes 28 in alignment with the assembled bolt holes 24 of the bearing cap for receiving assembly bolts 25. The container seat 26 may be provided with locking serrations on the lower surface, but it has been found to be a manufacturing expedient to machine a separate locking plate 29 with a channel of serrations 30 laterally provided on the under surface thereof, and a stud 31 on the upper surface which may be fitted into an aperture 32 provided in the container seat 26. The two members may then be welded together to form a single component part of the adjustable spring shackle mounting. Fitted into the serrated channel 30 is an adjustable lock plate 33 having the entire upper surface serrated 34 to engage a portion of the serrations 30 in the channel of the locking plate 29. Since said adjustable plate 33 is the same width as the fixed locking plate serrated channel 30 but of lesser length, it is longitudinally movable therein. Centrally located on the adjustable locking plate 33 is a stud 35 adapted to engage the spring container 36.

The upper surface of the spring container 36 is provided with an aperture 37 centrally positioned to receive the adjustable locking plate stud 35. This spring container is substantially rectangular in shape with one end open to receive the end portions of a leaf spring 15 and the bottom member 38 is removable to facilitate placement of spring cushions. Elongated slots 39 are provided in the top and removable bottom members of the container 36 to receive outwardly extending ends 40 of the upper confined leaf 41 and lower confined leaf 42 of the leaf spring 15. The elongated slot 39 in the top member is provided with a downwardly extending flange to help position a cushion described hereinafter. The three solid sides of the container 36 are provided with lugs 43 having holes 44 therein registering with holes 45 provided in the removable bottom member 38 for securing the two members together with bolts 46 and nuts 47.

Serrated rubber plates 48 are placed in a manner such that they act as cushions between the contained spring ends and the container. One such rubber plate is positioned on top of the uppermost leaf 41 and held in place by the downwardly extending flange of the aperture 39 and the shallow flanges 50 on the top and sides of the otherwise open end of the container. Another such serrated plate 48 is similarly positioned beneath the lower spring leaf 42 and held in place by the outwardly extending end 40 of the lower spring leaf 42 and a flange 56 provided on the removable bottom plate 38. Vertical solid rubber plates 49 are positioned intermediate the side members of the container and the spring and held in place by the flanges 50 on the otherwise open end of the container and the removable bottom member 38.

The removable bottom plate 38 has elongated slots 51 adapted to receive the assembly bolts 25 and permit longitudinal movement of the assembled spring container 36 therewith. The lower surface of the slotted sections is provided with serrations 52 parallel to and of the same pitch as the serrations 30 in the locking plate 29. These serrations 52 engage similar locking serrations 53 of the same pitch on the assembly bolt head 54 thereby preventing lateral movement once assembled.

In assembling the adjustable spring shackle mounting, the serrated rubber plates 48 and solid rubber plates 49 are placed in the spring container 36 and the outwardly extending ends 40 of the upper spring leaf 41 and lower spring leaf 42 are inserted in the apertures 39. The removable bottom member 38 is then bolted to the spring container 36. The assembly bolts 25 are then inserted through the elongated slots 51 in the spring container removable bottom member 38, and the serrations 52 on the assembly bolt head 53 are interlocked with the serrations 52 on the bottom of the removable member 38. The adjustable locking plate stud 35 is inserted in the aperture 37 provided in the top member of the spring container 36. The spring container seat 26 is then inserted on the assembly bolts 25 and its serrated channel 30 interlocked with the serrations 34 of the adjustable locking plate 33. This assembly is disposed underneath or on top of the axle 12 and secured to the bearing cap 22 resting upon the axle and inserted on the assembly bolts 25. The assembly bolt nuts 55 are threadedly engaged with the assembly bolts 25 to secure the adjustable spring shackle mount to the axle.

When adjustment is necessary, the assembly bolt nuts 55 are loosened sufficiently to release the locking engagement of the serrations 30 and 34 provided on the locking plate 29 and adjustable locking plate 34 and the serrations 52 and 53 provided on the removable spring container bottom member 38 and assembly bolt head 54. The axle 12, bearing cap 22, spring container seat 26, and locking plate 29 are laterally moved with respect to the adjustable locking plate and spring container 36 to the desirable distance, this movement being permitted by the lateral movement of the assembly bolts 25 in the elongated slots 51. The serrations 53 on the assembly bolt head 54 are reengaged with the serrations 52 on the removable bottom plate 38 as are the serrations 30 and 34 on the locking plates 29 and 33 since the pitch of all serrations are the same. The assembly bolt nuts 55 are then tightened on the bolts 25 fastening the component parts in the adjusted position.

The invention has been described with all of the various axles positioned above the leaf springs, but the invention is not so limited as it is equally operable with the various axles suspended beneath the springs. Likewise, the fixed axles may be positioned above the springs while the driving axle is suspended beneath and vice-versa.

Having thus described my invention, what I claim as new and wish to secure by Letters Patent is:

1. An adjustable spring shackle comprising a spring container, a seat for the container, leaf-spring means having an end portion thereof disposed in the said container, means anchoring the leaf-spring means to the container in longitudinal fixed relationship, cushion means intermediate the leaf-spring means and the container, a lock plate mounted on the container, a second lock plate mounted on the container seat, cooperating means on the lock plates anchoring the said plates together while permitting predetermined longitudinal adjustment therebetween, and means for clamping the spring container to the plates in a manner such that the longitudinal relationship between the spring container and the container seat can be changed selectively.

2. An adjustable spring shackle comprising, in combination, a spring container having a removable bottom member, leaf spring means having an end portion thereof disposed in said container, means anchoring said leaf spring to said container in longitudinal fixed relationship, cushion means intermediate said leaf spring means and said container, a plate swively mounted on said container, a second plate longitudinally movable with respect to said first-mentioned plate, means adjustably locking said plates in predetermined longitudinal relationship, and means clamping said spring container to said second-mentioned plate in a manner such that the longitudinal relationship therebetween can be selectively changed.

3. An adjustable spring shackle comprising, in combination, a spring container, a seat for the container, leaf-spring means having an end portion thereof disposed in the container, means anchoring the leaf-spring means to the container in longitudinal fixed relationship, cushion means intermediate the leaf-spring means and the container, a lock plate mounted on the container, serrations on the upper surface of the plate, a second lock plate mounted on the container seat and provided with serrations having the same pitch as the serrations on the first-mentioned plate, thereby providing interlocking surfaces longitudinally adjustable with respect to each other, the first-mentioned plate securing the second plate to the container, and means clamping the plates to the container in a manner such that the longitudinal relationship between the spring container and the spring container seat can be changed selectively.

4. An adjustable spring shackle comprising, in combination, a spring container, and a removable bottom member provided with an aperture, leaf spring means having an end portion thereof disposed in said container, and an outwardly extending end portion inserted in the aforementioned aperture of the spring container bottom member, cushion means intermediate said spring means and said container, a plate swively mounted on said container, and having the upper surface thereof serrated, a second plate longitudinally movable with respect to said first-mentioned plate and having a surface thereof adapted to engage the aforementioned serrated surface of said first-mentioned plate, and means clamping said spring container to said second-mentioned plate in a manner such that the longitudinal relationship therebetween can be selectively changed.

5. An adjustable spring shackle comprising, in combination, a spring container having a removable bottom member and an aperture in at least one horizontal surface, leaf spring means disposed in said container and having an end portion of at least one leaf of said leaf spring means outwardly extending and engaging the aforementioned aperture in such spring container; rubber cushioning means disposed intermediate said leaf spring means and said container, a plate swively mounted on said container, and serrations provided on the upper surface thereof, a second plate longitudinally movable with respect to said first-mentioned plate, and serrations engaging the aforementioned serrations on said first-mentioned plate, and means clamping said spring container to said second-mentioned plate in a manner such that the longitudinal relationship therebetween can be selectively changed.

6. An adjustable spring shackle comprising, in combination, a spring container having a removable bottom member, transverse apertures provided in the top and bottom members, elongated slots provided in said removable bottom member, and transverse serrations in association with said slots, leaf spring means having an end portion thereof disposed in said container, and outwardly extending ends of the upper and lower leaves of said spring inserted in the aforementioned transverse apertures of the spring container; serrated rubber cushion means intermediate said spring means and said container, a plate swively mounted on said container, and serrations provided in a horizontal surface of said plate, a second plate longitudinally movable with respect to said first-mentioned plate, and serrations operably locking with the serrations of said first-mentioned plate, bolts inserted through the elongated slots of the aforementioned removable bottom member of said spring container and operably fastening said container to the second-mentioned plate, and serrations provided on said bolt head and engaging the serrations on said removable bottom member, each of the aforementioned serrations having the same pitch.

HOWARD WILSON.

REFERENCES CITED

The following references are of record in the file of this patent:

UNITED STATES PATENTS

| Number | Name | Date |
| --- | --- | --- |
| 734,080 | Morrison | July 21, 1903 |
| 1,461,497 | Robbins | July 10, 1923 |
| 1,748,747 | Alden et al. | Feb. 25, 1930 |
| 1,773,508 | Wollensak | Aug. 19, 1930 |
| 2,284,646 | Eidal | June 2, 1942 |
| 2,290,034 | Carter | July 14, 1942 |